United States Patent
Lipasti et al.

(10) Patent No.: US 10,339,439 B2
(45) Date of Patent: Jul. 2, 2019

(54) EFFICIENT AND SCALABLE SYSTEMS FOR CALCULATING NEURAL NETWORK CONNECTIVITY IN AN EVENT-DRIVEN WAY

(71) Applicant: Thalchemy Corporation, Madison, WI (US)

(72) Inventors: Mikko H. Lipasti, Lake Mills, WI (US); Andrew Nere, Madison, WI (US); Atif Hashmi, Fremont, CA (US); John F. Wakerly, Glenview, IL (US)

(73) Assignee: Thalchemy Corporation, Madison, WI (US)

( * ) Notice: Subject to any disclaimer, the term of this patent is extended or adjusted under 35 U.S.C. 154(b) by 0 days.

(21) Appl. No.: 14/873,138

(22) Filed: Oct. 1, 2015

(65) Prior Publication Data
US 2016/0098629 A1    Apr. 7, 2016

Related U.S. Application Data

(60) Provisional application No. 62/058,565, filed on Oct. 1, 2014.

(51) Int. Cl.
  *G06N 3/04*    (2006.01)
  *G06N 3/08*    (2006.01)
(52) U.S. Cl.
  CPC ............. *G06N 3/04* (2013.01); *G06N 3/08* (2013.01)
(58) Field of Classification Search
  CPC .................................. G06N 3/04; G06N 3/08
  See application file for complete search history.

(56) References Cited

U.S. PATENT DOCUMENTS

| | | | | |
|---|---|---|---|---|
| 5,786,951 | A * | 7/1998 | Welland | G11B 5/09 360/46 |
| 6,061,417 | A * | 5/2000 | Kelem | G06F 7/584 377/26 |
| 2004/0143559 | A1* | 7/2004 | Ayala | G06N 3/086 706/13 |

(Continued)

FOREIGN PATENT DOCUMENTS

WO    WO 93/14459 A1    3/2009

OTHER PUBLICATIONS

Kozic, S., et al. "Low-density codes based on chaotic systems for simple encoding." IEEE Transactions on Circuits and Systems I: Regular Papers 56.2 (2009): 405-415.*

(Continued)

*Primary Examiner* — Eric Nilsson
(74) *Attorney, Agent, or Firm* — Lowenstein Sandler LLP

(57) ABSTRACT

Systems and methods achieving scalable and efficient connectivity in neural algorithms by re-calculating network connectivity in an event-driven way are disclosed. The disclosed solution eliminates the storing of a massive amount of data relating to connectivity used in traditional methods. In one embodiment, a deterministic LFSR is used to quickly, efficiently, and cheaply re-calculate these connections on the fly. An alternative embodiment caches some or all of the LFSR seed values in memory to avoid sequencing the LFSR through all states needed to compute targets for a particular active neuron. Additionally, connections may be calculated in a way that generates neural networks with connections that are uniformly or normally (Gaussian) distributed.

28 Claims, 8 Drawing Sheets

(56) References Cited

U.S. PATENT DOCUMENTS

| | | | | |
|---|---|---|---|---|
| 2007/0280270 | A1* | 12/2007 | Laine | G06N 3/02 370/400 |
| 2007/0288406 | A1* | 12/2007 | Visel | G06N 3/10 706/14 |
| 2009/0076993 | A1* | 3/2009 | Ananthanarayanan | G06N 3/049 706/44 |
| 2009/0808681 | | 3/2009 | Murabayashi et al. | |
| 2009/0240641 | A1 | 9/2009 | Hasimoto | |
| 2012/0259804 | A1* | 10/2012 | Brezzo | G06N 3/063 706/25 |
| 2014/0143194 | A1* | 5/2014 | Yoon | G06N 3/049 706/25 |
| 2014/0215235 | A1 | 7/2014 | Lipasti et al. | |
| 2014/0229411 | A1 | 8/2014 | Richert et al. | |
| 2014/0241334 | A1 | 8/2014 | Martin et al. | |
| 2015/0046382 | A1* | 2/2015 | Rangan | G06N 3/049 706/25 |

OTHER PUBLICATIONS

International Search Report and Written Opinion dated Jan. 4, 2016 for PCT/US2015/53599.

David E. Rumelhart, Geoffrey E. Hinton, and Ronald J. Williams; *Learning Internal Representations by Error Propagation*; No. ICS-8506; California University of San Diego, La Jolla Institute for Cognitive Science, 1985.

Wolfgang Maass, Thomas Natschläger, and Henry Markram; *Real-time Computing Without Stable States: A New Framework for Neural Computation Based on Perturbations*; Neural Computation 14.11 (2002), pp. 2531-2560.

Wolfgang Maass and Henry Markram; *On the Computational Power of Circuits of Spiking Neurons*; Journal of Computer and System Scienses 69.4 (2004) pp. 593-616.

Dharmendra S. Modha and Raghavendra Singh; *Network Architecture of the Long-Distance Pathways in the Macaque Brain*; Proceedings of the National Academy of Sciences 107.30 (2010) pp. 13485-13490.

Henry Markram, Joachim Lübke, Michael Frotscher, and Bert Sakmann; *Regulation of Synaptic Efficacy by Coincidence of Post-synaptic APs and EPSPs*; Science vol. 275.5297 (1997) pp. 213-215.

Vasileios Tenentes, Xrysovalantis Kavousianos, and Emmanouil Kalligeros; *State Skip LFSRs: Bridging the Gap Between Test Data Compression and Test Set Embedding for IP Cores*; Proceedings of the Conference on Design, Automation and Test in Europe, ACM, 2008.

Daniel P. Buxhoeveden and Manuel F. Casanova; *The Minicolumn Hypothesis in Neuroscience*; Brain 125 (2002) pp. 935-951.

* cited by examiner though these schemes are relatively efficient to implement and may be scalable to many endpoints, but still do not provide robust scaling to anywhere near biological scale.

EFFICIENT AND SCALABLE SYSTEMS FOR CALCULATING NEURAL NETWORK CONNECTIVITY IN AN EVENT-DRIVEN WAY

RELATED APPLICATIONS

This application claims priority from U.S. Provisional Application Ser. No. 62/058,565, filed Oct. 1, 2014, which is incorporated herein by reference in its entirety.

FIELD OF THE INVENTION

The present invention relates generally to calculating neural network property parameters including connectivity, and in particular to methods and apparatuses for efficient and scalable calculation of neural network property parameters including connectivity in an event-driven way to reduce storage of data relating to the connectivity related data and improve computational efficiency.

BACKGROUND OF THE INVENTION

Modeling the brain has been a long-standing goal of scientists and engineers alike. Many neural networks and neurally-inspired algorithms have been proposed, designed, and built with different goals and purposes in mind. Some of these algorithms have been developed to further the understanding of the human brain through detailed models. Others have developed these algorithms to mimic the decision-making and data classification abilities of the human brain. Computational hardware designers have even captured the ultra-low power processing capability of the brain, which is inherently more energy efficient than typical microprocessors.

Regardless of the neural algorithm, its implementation, or its purpose, there is one commonality across all cases: these algorithms model neurons and the connectivity between them. In the human brain, a neuron may connect to tens or hundreds of thousands of other neurons. In biological neural networks, supporting this high-scale connectivity isn't much of an issue, since the dendritic and axonal branches of neurons can grow in 3-dimensional space to form direct connections with other neurons. However, with artificial neural software models and neuromorphic hardware implementations, this high-scale connectivity presents a significant challenge.

Neuromorphic hardware designs such as the IBM Neurosynaptic Core have used a crossbar, which allows for all-to-all connectivity between 256 neurons; however this solution clearly fails to scale to the connectivity levels of biological neurons. Furthermore, the crossbar structure only supports connectivity with the same population of 256 neurons. In biological systems, connectivity occurs across populations and with much higher degrees of fan-in and fan-out than supported by this hardware crossbar.

Conventional approaches for scaling hardware connectivity to larger sets of neurons take their inspiration from the field of interconnection networks, where all-to-all approaches, i.e. crossbars, are known to not scale beyond a few tens of endpoints. Instead, direct (where every node is an endpoint) and indirect (where some nodes are just purely for routing) network topologies are used to connect large numbers of endpoints together by enabling forwarding or routing of messages via multiple hops in the network. These schemes are relatively efficient to implement and may be scalable to many endpoints, but still do not provide robust scaling to anywhere near biological scale.

Computer systems scale to millions of nodes by employing a combination of hardware and software, as demonstrated in the architecture of the Internet. Here, the interconnection network relies on hierarchy and locality of communication patterns to enable systems with millions of nodes. It does so by providing robust connectivity to localized groups, growing in hierarchical clusters to larger aggregate node counts, but providing only limited connectivity and bandwidth to non-local nodes. The Internet's hierarchical connectivity has an analogue in neural systems, where there are far more local connections than global (distal) connections, so hierarchical approaches seem like an appealing solution.

Hybrid hardware/software as well as pure software implementations for scalable neural connectivity enable networks with far more connections than direct hardware solutions like IBM's Neurosynaptic crossbar. The number of connections need not be supported by physical connections; rather, connections between neurons can be stored in memory, allowing for much more universal neural connectivity schemes and architectures. However, this flexibility comes at a price: as the system is scaled to biological connectivity levels, the amount of memory needed to store the connectivity graph grows drastically. Each endpoint must be assigned an address, and every endpoint has to maintain a list of its connections, ideally for both upstream and downstream neurons.

Consider as an example a billion neuron network with 10,000 connections projecting from each neuron: this would require $\log_2(10^9)$ bits/address$\times 10^9$ nodes$\times(2^4$ addresses/node)=75 TB of storage just for the connections. Even a modest million-neuron network would require 50 GB to store the connectivity graph. The sheer amount of memory needed, the power consumed by that memory, as well as the latency to access it, quickly become the bottleneck in such systems.

Available solutions for implementing connectivity in neural algorithms suffer from limited connectivity, poor flexibility, high overheads and memory requirements, or all of the above. While these issues are most evident when considering the connectivity of large scale neural algorithms, the same problems exist for many of the other neuron parameters that are modeled in either software or hardware systems, such as the neuron's firing threshold, the synaptic weights, or the neuron's membrane leak. In traditional techniques, each of these, and many more, parameters must be stored in memory and accessed often during the execution of the neural algorithm. Therefore, in both hardware and software implementations, there is a clear need for a more scalable and efficient neural system.

SUMMARY OF THE INVENTION

The present invention relates to systems and methods that enable neural algorithms and neural models to be implemented in software, built in hardware, or the combination of both, without requiring many of the traditional overheads associated with neural system design. The disclosed solution forgoes the traditional technique of storing the neural system's connectivity and other parameters in memory, and instead using a method to cheaply, efficiently, and effectively re-calculate necessary parameters on the fly and as needed. The disclosed solution is particularly applicable to neural networks that utilize sparse and/or random connectivity, such as Liquid State Machines (LSMs) and large-scale models of biological neural networks. In these types of applications, the Efficient and Scalable Neural System re-calculates neural connectivity, and other parameters as-needed, rather than storing them in memory.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
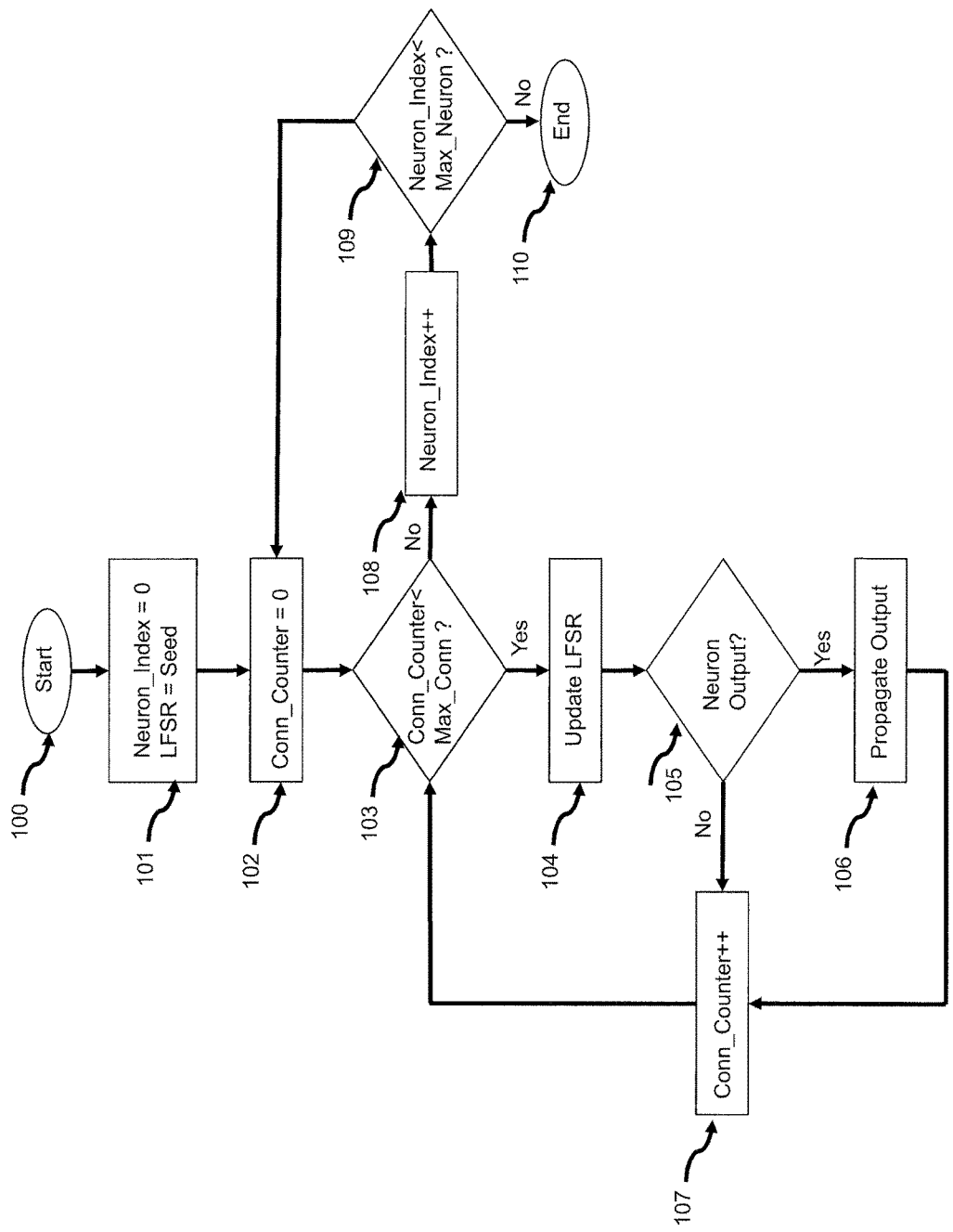
FIG. 1 is a flow chart illustrating the operation of a scalable and efficient neural system according the present invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present invention encompasses present and future known equivalents to the known components referred to herein by way of illustration.

1. Introduction

The systems described the present application allow implementation of efficient and scalable neural networks in both software and hardware. While traditional techniques often store the connectivity and other parameters of the neurons in memory, and then reference that stored state information when necessary, the systems according to the present invention compute the connections between neurons, as well as many other neuron parameter, in an event-driven and on-demand manner. With these disclosed embodiments of the present invention, the amount of required memory is substantially lower than currently available hardware and software neural systems. Furthermore, many optimizations described herein ensure that the computational requirement for embodiment systems can be minimized, allowing large-scale neural models to be developed without many of the bottlenecks encountered by traditional implementations.

The systems according to the present invention take advantage of the stochastic nature of many of these parameters: modeling of biological neural networks often assumes that aggregate connectivity within a given neural population, as well as across populations, is probabilistic in nature. This mimics the biology, where connections are not fixed and do not behave in entirely deterministic fashion at the individual level, but instead demonstrate consistent behavior only when viewed in aggregate (i.e. the law of large numbers applies).

This type of neural networks is quite different from the most commonly understood and widely deployed neural network: the traditional Multi-Layer Perceptron (MLP) model. See, e.g., *Learning internal representations by error propagation* by David E. Rumelhart, Geoffrey E. Hinton, and Ronald J. Williams, No. ICS-8506. CALIFORNIA UNIV SAN DIEGO LA JOLLA INST FOR COGNITIVE SCIENCE, 1985 for more detailed description about MLP. MLPs are typically composed of three or more layers of neurons, which exhibit all-to-all connectivity between adjacent layers. These connections typically have an associated strength, or weight, which is continuously modified during a training phase. While MLPs have been demonstrated to be useful in a number of applications, the perceptron model, the all-to-all connectivity, and traditional MLP training algorithms have little in common with biological neural networks. Current engineering constructs and models of biological neural networks use more biologically accurate neuron models, such as the Leaky Integrate-and-Fire (LIF) neuron, and connectivity schemes.

Leaky Integrate-and-Fire (LIF) Neurons

In the following description of an embodiment of a scalable and efficient neural system according to the present invention, it is assumed that the modeled neurons are of the LIF variety. In sum, a typical process with the LIF neurons comprises the following steps:

1) the neuron integrates all of its current inputs (typically spikes sent from upstream neurons multiplied by the synaptic weight, or the strength of the connection) and adds them to its current membrane potential;
2) if the membrane potential is greater than the neuron's firing threshold, the neuron fires, and the membrane potential is set to a "resting level";
3) if the neuron fires, it must propagate an output to its downstream target neurons;

4) if the membrane is not at the "resting level", the membrane leaks towards the "resting level".

The process is repeated at each time step (i.e. the outputs generated in step 3 are the inputs in step 1).

However, it is noted that the system described above are also applicable to all other types of neuron models and neural algorithms, such as Hodgkin-Huxley neurons, Izhikevich neurons, and many more. Also, it should be noted that the steps may not necessarily executed exactly in the same order as discussed above.

In many LIF neural networks, a flexible connectivity scheme is required to facilitate communication between modeled neurons. This in turn allows the neuron model to be used in a wide variety of engineering applications and models of biological neural networks. With LIF neurons, there are typically a wide variety of different parameters for both the neuron itself, as well as the connections between neurons. Therefore, with traditional techniques, there is typically a high amount of memory needed to store the networks' architecture and parameters.

Target Neural Algorithms of the Scalable and Efficient Neural System

The scalable and efficient neural systems according to the present invention employ a more modern class of neural algorithm. These algorithms do not necessarily require that the connectivity or the weights of the connections change over time to be useful. That is, these modern classes of neural network do not necessarily require training or learning to be useful, as will be discussed in greater detail below. Furthermore, these embodiments forgo the all-to-all connectivity, and typically use sparse and/or random connectivity between neurons. This is drastically different from traditional MLP neural networks, which clearly required a training/learning rule (such as error backpropagation) to be rendered useful.

A Liquid State Machine (LSM) is one of the more modern neural algorithms employed in the present invention, which is often used as a computational construct for the task of classifying time-varying signals. See, e.g., "Real-time computing without stable states: A new framework for neural computation based on perturbations" by Wolfgang Maass, Thomas Natschläger and Henry Markram, *Neural computation* 14.11 (2002) and "On the computational power of circuits of spiking neurons", *Journal of computer and system sciences* 69.4 (2004) for more detailed information regarding LSM.

Figure 2:
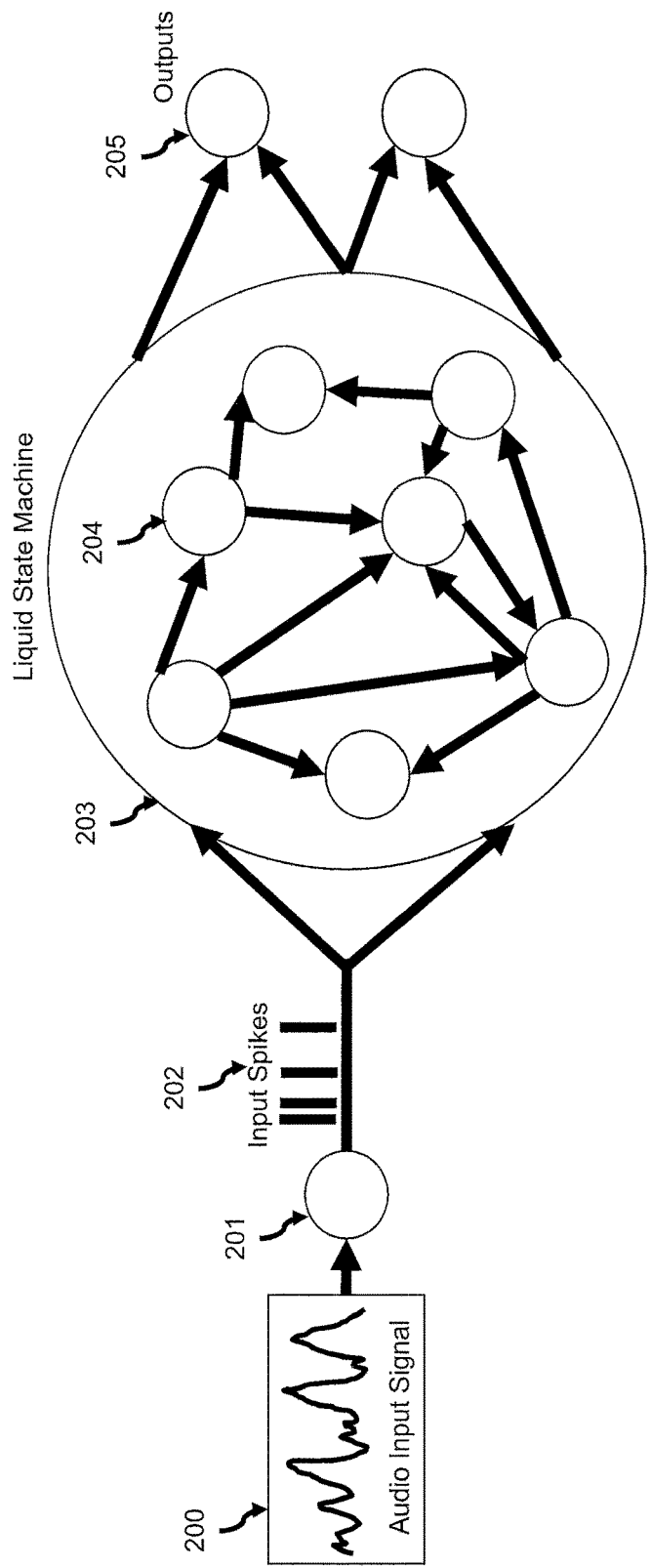
FIG. 2 depicts a typical network architecture using an LSM.

FIG. 2 depicts a typical network architecture of an LSM. LSMs are typically composed of a number of modeled LIF neurons, which are randomly connected to each other. According to some embodiments, these connections are not changed after they are created. A subset of the neurons in the LSM receives a time-varying input from an external source. In a typical operation, a time varying signal, such as an audio signal 200, is the input to the network. With an LSM, typically some type of encoder (201) is used to convert the raw signal into spikes (202), which serve as the inputs to the LSM (203). The LSM itself is typically composed of spiking LIF neurons (204). In the majority of LSM implementations, the connectivity between the neurons in an LSM is random and fixed. Finally, the activity states of the LSM are typically classified by one or more different output units (205), which may be linear threshold units, perceptrons, or another type of classifier.

The random and recurrent connectivity of the LSM turns the time-varying input into a spatio-temporal pattern, which captures both the current and past inputs to the LSM. The process is somewhat analogous to the way that a Fast Fourier Transform converts a signal represented in the time domain to the frequency domain. In most applications of LSM neural networks, there is no training/learning in the LSM itself. Typically in LSMs, linear readout units can be trained to classify the unique spatio-temporal patterns generated by the LSM. The architecture of the LSM is "initialized" but not trained. Different LSM architecture parameters, such as the network size and the number of connections will determine the spatio-temporal patters it creates. A well-designed LSM neural network is capable of creating linearly separable spatio-temporal patterns (without online training/learning) that can be easily classified by simple linear readout units.

Models of biological neural networks often exhibit similar properties in their connectivity. Large-scale models cannot yet accurately reproduce every single connection between every neuron in biological brains; however, many detailed models exist that capture the statistical properties of connections between different brain regions. See, e.g., "Network architecture of the long-distance pathways in the macaque brain" by Dharmendra S. Modha and Raghavendra Singh, *Proceedings of the National Academy of Sciences* (2010). The actual connections themselves though, are often random. In these types of models, again, online-learning or training is not the goal of the neural network. These types of models are developed to better understand how activity propagates through different regions of the brain, as opposed to traditional MLP neural networks (which typically can only classify static patterns).

It should be noted that the scalable and efficient neural systems disclosed herein can be applied to neural algorithms that utilize online learning. However, these more modern neural algorithms, such as LSMs and biological neural network models, also use more modern and biologically realistic learning algorithms. For example, spike-timing dependent plasticity (STDP) changes connection strengths based on the relative timing between a neuron's inputs and outputs (spikes), and has been observed in biological neurons. See, e.g., "Regulation of synaptic efficacy by coincidence of postsynaptic APs and EPSPs" by Henry Markram, et al. *Science* (1997). However, these types of learning rules are quite different from the error backpropagation rule used in traditional MLP neural networks, in which an input pattern is "clamped", and the connection weights are modified to minimize error.

In LSMs, models of biological neural networks, and many other non-MLP neural algorithms, parameters such as the neuron connectivity may initially be chosen at random (or with a particular distribution), and then stored and recalled in memory as needed. A scalable and efficient neural system according to the present invention instead simply re-calculates these connections and other parameters, in a deterministic way, such that the state and structure of the neural algorithm is preserved, without requiring a large amount of memory to store the state. The disclosed solution may also reduce the storage required for the connect weights/strengths themselves—in addition to the actual mapping of connections between neurons in sparse and randomly connected neural networks.

Essentially, what is needed is an efficient method by which the neural algorithm can be reproduced, and the scalable and efficient neural systems according to the present invention achieve this goal. This disclosure describes a specific mechanism for reconstructing stochastic connectivity between neurons in a single population at runtime, as the system evaluates, rather than explicitly storing all connections in memory or in a hardware crossbar structure. This same approach can be extended to a number of other neuron parameters as well as connectivity across populations of neurons.

2. Detailed Description of an Embodiment

The following provides details relating to various embodiments of scalable and efficient neural systems according to the present invention.

2.1 Computing/Re-Computing Neuron Connectivity

The primary value of the Scalable and Efficient Neural System is that, for many classes of neural algorithms, including LSMs and large-scale models of biological neural networks, the connectivity, as well as many other parameters, can efficiently be calculated/re-calculated as needed. This means with the Scalable and Efficient Neural System, the connectivity graph of the neural network does not need to be stored in memory. However, a neural algorithm or model using the Scalable and Efficient Neural System must provide functional equivalence to a traditional neural network model, which uses a connectivity graph stored in memory.

In the described embodiment of Scalable and Efficient Neural System, a Linear Feedback Shift Register (LFSR) is used to calculate/re-calculate neuron connectivity. LFSRs are often used as pseudo-random number generators. This makes an LFSR particularly suitable for neural algorithms that exhibit random (or pseudo-random) connectivity, such as a LSM or a model of a biological neural network. When a neuron fires, the LFSR can be used to calculate/generate its target (i.e. downstream) neurons. Furthermore, the LFSR can be sized in an appropriate way to ensure that the targets aren't repeated (more details below.). However, because the sequence generated by the LFSR is deterministic (i.e. each state is a function of its previous state), the LFSR can always be seeded with a known value, and will generate a deterministic sequence of values afterwards. In this way, when a neuron fires, the LFSR can be seeded with the same value, and it will always generate the same targets—ensuring the persistence of the neural algorithm's structure. In the following, this embodiment will be described in greater detail.

It should be noted that, while an LFSR is particularly useful for neural algorithms like an LSM, the Scalable and Efficient Neural System is not limited to LFSR-based implementations. The Scalable and Efficient Neural System may be implemented using other pseudo-random number generators, other mathematical functions, or any other computational construct, which can be used to calculate and re-calculate the connectivity (and other parameters) in a consistent manner. However, hereinafter, the computational construct used for this purpose shall be referred to as an LFSR.

2.2 Connecting Individual Neurons in a Single Population of Neurons

FIG. 1 illustrates a diagram of the operation of a scalable and efficient neural system according to the present invention. Each time step of the neural algorithm begins at 100. While neurons can be updated in parallel, this diagram assumes an embodiment where the modeled neurons are updated sequentially. Each neuron is identified by an index, starting with zero, for example. An index counter Neuron_Index for the neurons in the population is set to zero and an LFSR used for the output connectivity is set to a predefined seed value (101). Next, a counter, Conn_Counter, for this particular neuron's outputs is also set to zero (102). While the current counter value of the output connection is below the maximum number of output connections (103), a target neuron corresponding to the current LFSR value is updated. It should be noted that the maximum number of output connections (Max_Conn in 103) can be set to a single value for all neurons to minimize the memory requirement, or can be individualized per neuron if such flexibility is more important than memory efficiency.

Next, the LFSR is updated (104). The value generated by the LFSR is the index of the targeted neuron. Assuming each neuron targets the same number of neurons, the total number of times the LFSR is sequenced is Max_Neuron*Max_Conn. As will be discussed below, the size and the polynomial of the LFSR can be intelligently designed to ensure connectivity is random and doesn't repeat sequences during a single time step of the neural algorithm, and bit masking can ensure that the targeted neuron falls between one and Max_Neuron (details follow below).

During each time step, it is determined if the currently evaluating neuron is generating an output (105). In this described embodiment, the neurons follow the operational steps of an LIF neuron, as described above in the Introduction section. In the case of a LIF neuron model, it is determined whether an output spike has been generated in this time step, that is, whether the sum of the neuron's inputs have increased its membrane potential above a firing threshold. In the described embodiment, each neuron must store its current membrane potential in memory, which allows inputs to be integrated by a neuron over multiple time steps. It should be noted that the described system may be used with neuron models that are simpler, or more complex, than the LIF neuron model.

If the neuron is generating an output, the output is propagated to the target neuron generated by the LFSR (106). Whether the neuron is generating an output or not, the output connection index is incremented (107) to ensure the LFSR generates the same output connectivity for each neuron in a deterministic way. For each neuron, this process is repeated for each of the neuron's output connections (103). Once the connection index is equal to the number of output connections, the neuron index is updated (108) and the process is repeated for the next neuron (109). If the neuron index is less than the total number of neurons, the connection index is reset to one (102). This process repeats until each of the neurons has updated the LFSR for each of its connections, and all the outputs have been propagated to the downstream neurons. The process ends for this time step when each neuron has completed these steps (110). This sequence is repeated for each subsequent time step of the neural network.

In the embodiment of the system as described in FIG. 1, the LFSR must be updated even when the current neuron is not generating an output (104). This is to ensure that each neuron will always target the exact same neurons when it generates an output. That is, even though the output targets of the LFSR are pseudo-random, the sequence of generated values is deterministic and repeatable between different simulated time steps of the neural algorithm, ensuring that a neuron maintains its connectivity. The seed is reset on each time step (101) and the LFSR is updated for every neuron for every connection (104) to ensure this behavior.

It should be noted that an Efficient and Scalable Neural System according to the present invention is not constrained by the particular ordering of the steps outlined in FIG. 1. For example, the "outer loop" in FIG. 1 could be the number of output connections, while the inner loop could be the number of neurons.

Application to Learning Networks

In many implementations of neural algorithms like LSMs or models of biologically inspired neural networks, connectivity and connection weights are fixed. For such networks, the above algorithm simply re-computes the target neurons and propagates an output each time the source neuron "fires". However, a scalable and efficient neural system according to the present invention can also be applied to neural algorithms that undergo a learning process.

In such an implementation, the weight/strength of each connection would still need to be stored. Weights would be most efficiently stored on the outputs of a neuron, since the neuron generating the output is re-calculating its targets each time it "fires" (as shown in FIG. 1). The variable weight would simply be added to the membrane potential of the downstream neuron. In networks of LIF neurons, such as LSMs or models of biological neural networks, a learning rule such as Spike Timing Dependent Plasticity (STDP), which modifies weights based on the relative "spike times" of two connected neurons are typically used; however, the Scalable and efficient neural system is not limited to any particular learning/training algorithms.

However, it should be noted that considering the algorithm described in this disclosure, using STDP or another learning rule can only modify the strength of an already existing connection (i.e. the deterministic connections generated by the LFSR in FIG. 1); it cannot result in forming a new connection between two neurons (since the algorithm as described above relies on being able to re-produce the same "target" neurons each time an output is generated).

2.3 Neural Connectivity Optimizations

The system described above can be further optimized to reduce runtime overhead and to control attributes of the connectivity graph that is continuously recreated at runtime by the system, described in the following subsections.

Storing LFSR Seeds

A key functional requirement of the system as described is that each neuron must deterministically reconstruct the same pseudo-random connectivity at each time step. This is ensured by resetting the LFSR to a single seed at the beginning of the time step, and sequencing through each LFSR state for each neuron and each of its connections. This can be wasteful in terms of compute resources in cases where neurons are idle and do not have spikes to communicate further downstream, but is required to make sure that subsequent neurons consistently reconstruct the same connectivity in that time step. For example, if a network contains 100 neurons, each of which has a fan-out of 100, the network must make 10000 (100×100) updates to the LFSR at each time step, even if only 5 of those neurons are firing (requiring ideally only 500 updates).

Figure 8:
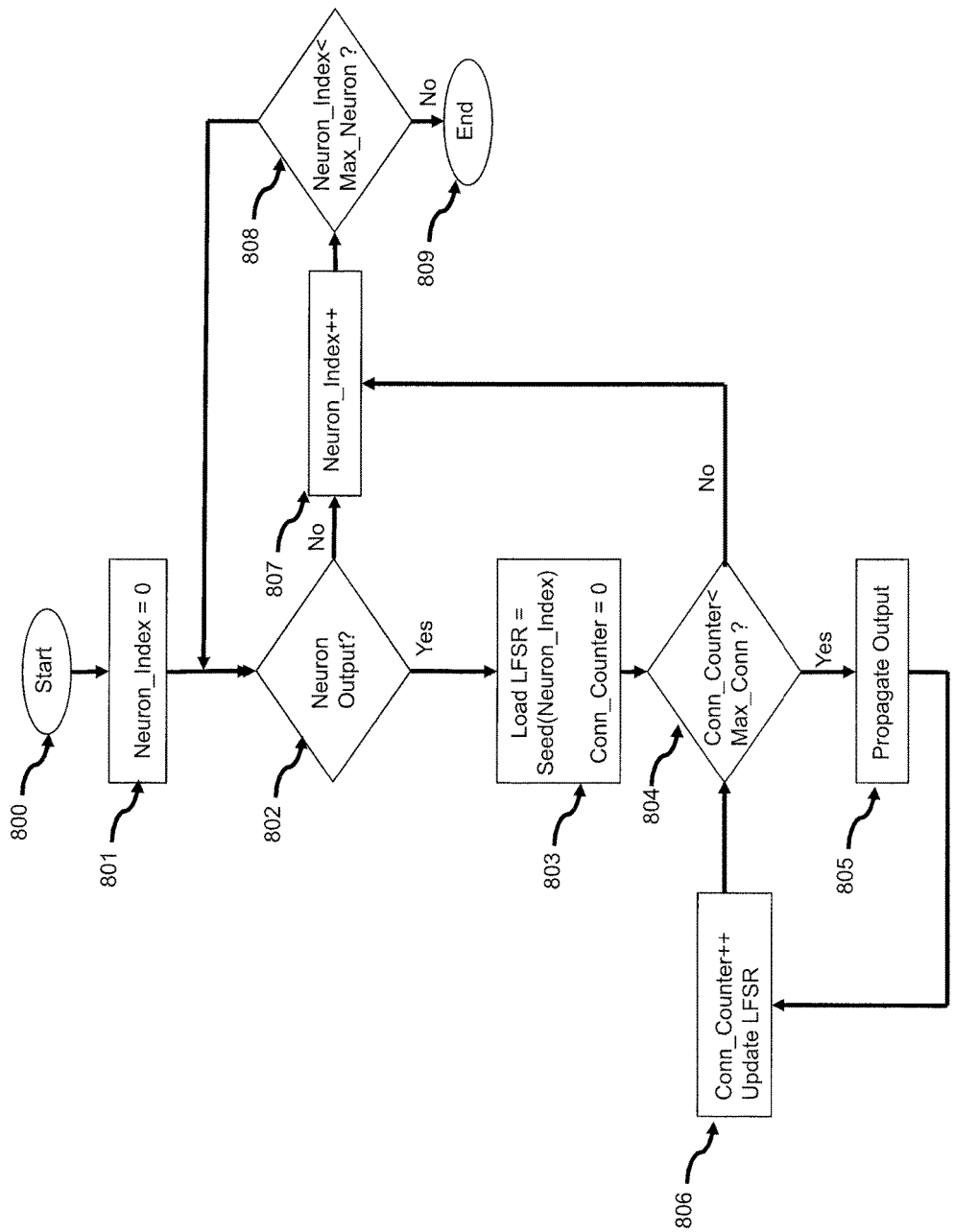
FIG. 8 is a flow chart illustrating the operation of yet another scalable and efficient neural system using an LFSR cache according the present invention

As an alternative to sequencing all LFSR states at every time step, each neuron can instead store its LFSR seed value directly, and, upon activation, restore that LFSR seed value before exercising the LFSR to re-generate its connectivity. Referring to FIG. 8, the method for storing a seed for every neuron Neuron_Index is illustrated. As before, on each time step the algorithm begins (800) and Neuron_Index is initialized to 0 (801). The membrane potential of the neuron is compared to its firing threshold, and if the neuron is firing, the LFSR can be loaded with the appropriate Seed (Neuron_Index) (803). The connection counter, Conn_Counter is also set to zero. While the Conn_Counter is less than the maximum number of output connections for Neuron_Index (804), the outputs are propagated to the target neurons (805) and Conn_Counter is incremented and the LFSR is updated (806). Afterwards, Neuron_Index is incremented (807). The process is repeated for all neurons (808) and ends after each neuron Neuron_Index has been updated and evaluated (809). Computationally, the main advantage is that the inner-loop of the algorithm (here, components 803-806) can be completely skipped whenever Neuron_Index has no output—significantly reducing the number of times the LFSR must be updated. As in FIG. 1 discussed above, Max_Conn may be a global value that is used for all neurons, or it may be different for different neurons, for example an array of values Max_Conn(Neuron_Index).

Storing the LFSR seeds enables arbitrary sequencing of the order in which neurons evaluate, rather than forcing the serial (and complete) evaluation order described above. More importantly, it allows the system to only evaluate those neurons that need to be evaluated, that is to say, the neurons that have fired in that time step and need to communicate spikes to their downstream neurons. Since firing rates are typically very low (~10 Hz in biological systems, and comparable in many artificial models), in the common case, only a small fraction of the neurons in the population will need to re-compute their connectivity, dramatically reducing the compute requirement for the algorithm. Even if many neurons are firing, storing LFSR seeds rather than a list of connected neurons still reduces the memory footprint for neuron connectivity by a factor on the order of Max_Conn, compared to the conventional approach.

Caching LFSR Seeds

The method of storing LFSR seeds discussed above incurs the expense of increasing the memory footprint, since each neuron now has to store the LFSR seed it needs to initialize its connectivity computation. This requires just a few bytes per neuron, but for large populations, this overhead grows significantly (e.g. a few terabytes of stored LFSR seeds for a billion neuron system). To reduce this rate of growth, the system can store LFSR seeds selectively, that is, it can cache them only as needed. For example, the system can rely on locality of firing in the network to cache the LFSR seeds for the last n neurons that have recently fired. This is analogous to instruction and data cache memories used in conventional processors, and could rely on a least-recently-used replacement policy to keep the most recent entries in the cache while evicting entries for neurons that have not recently fired.

Figure 5:
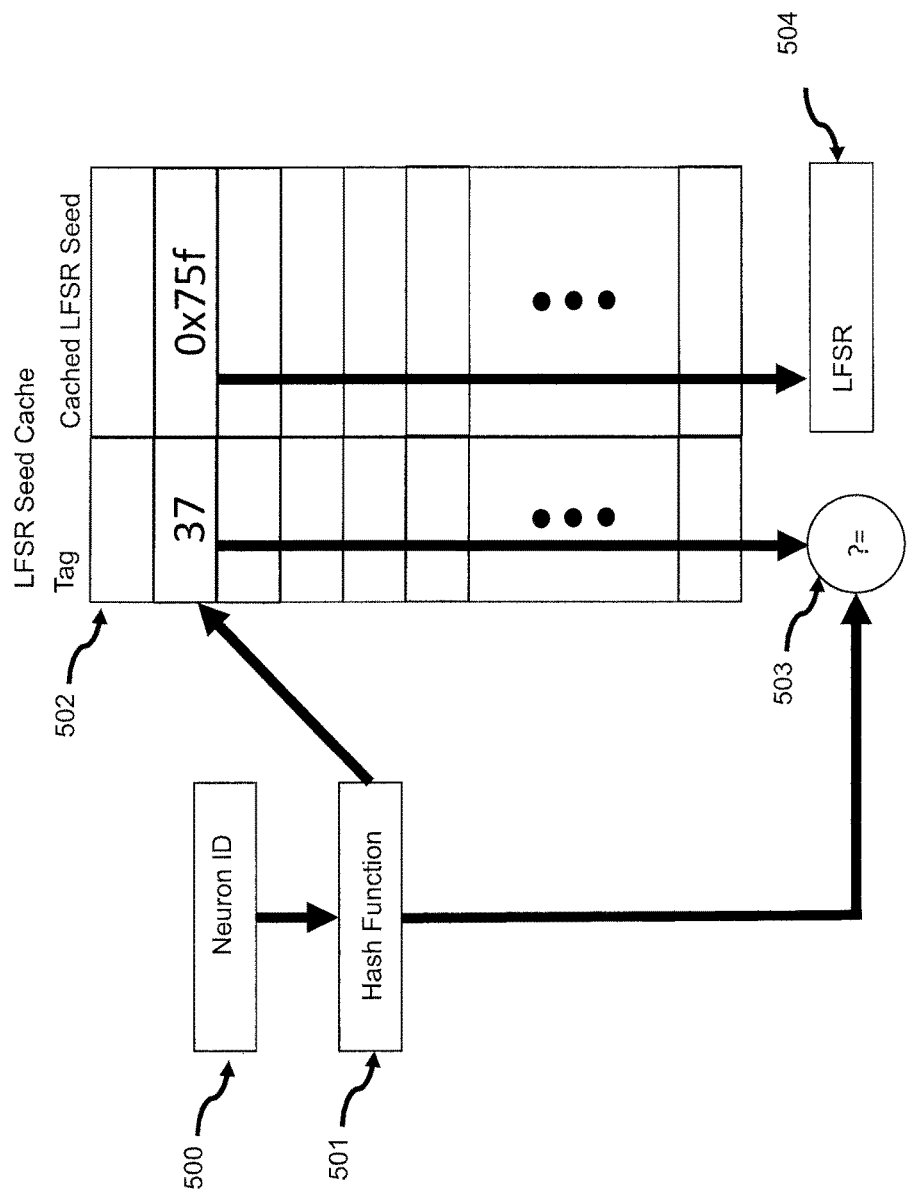
FIG. 5 depicts an LFSR seed cache used for computing connectivity according to the present invention.

Referring now to FIG. 5, the LFSR seed cache (502) can be organized in any of a number of ways familiar to those skilled in the art of cache memory design, including direct-mapped, set-associative, fully-associative, or any of a broad array of configurations.

In such a system, whenever a neuron fires, it checks to see if its LFSR seed is cached by applying a hash function (501) to the neuron ID (500), and accessing a corresponding entry in the LFSR Seed Cache (502). A comparator (503) is used to check if the tag for the entry matches the neuron ID. If so, the system uses the cached ID (504) to re-compute its connectivity. If the seed is not cached, the neuron will fall back on the system described above to re-compute its LFSR seed by initializing the LFSR to the global seed and shifting the LFSR the correct number of times to reach its own seed value. It then inserts the seed value into the cache and computes its connectivity using that seed value.

As an alternative to dynamically deciding which seeds to cache based on recent firing behavior, the system could cache a fixed subset of LFSR seeds, and use these as the basis for re-computing the missing seeds. For example, the cache might contain the seed for every 10th neuron (i.e. where (neuron index modulo 10)==0). In this design, any time a neuron fires, if it is one of the cached neurons, it simply accesses the LFSR seed cache directly, using a hash function (501) based on the neuron ID (500), and uses the cached value without using the tag comparator (503). If it is not a cached neuron, it finds the closest preceding cached LFSR value from the LFSR seed cache (502), and then shifts the LFSR the appropriate number of times to reach its own seed value. For example, if every 10th neuron is cached and a neuron with an ID of 197 just fired, it will find the cached LFSR seed for a neuron with an ID of 190, and will shift the LFSR as many times as neurons with IDs 190-196 would to compute their connectivity, and then uses the resulting reconstructed LFSR seed to compute its connectivity.

Note that if the subset of neurons to be cached is selected by a fixed, uniform function such as selecting every 10th neuron as described above, then a corresponding, simpler cache data structure and access algorithm may be used. For example, the cache may simply be an array of LFSR seeds, whose number of entries is the number of neurons divided by 10, and where the cache index for the seed of a particular neuron for which (neuron index modulo 10)==0) is (neuron index div 10).

The fixed and dynamic caching schemes described in the preceding paragraphs could also be combined in various ways that are obvious to those skilled in the art. For example, a dynamic cache could be initialized with a modulo-based fixed scheme, or a fixed scheme could be augmented with a dynamic scheme that also caches the LFSR seeds of recently fired neurons.

The size and organization of the LFSR seed cache is, a tunable parameter in the system that can be set to optimize the cost of computation against the cost of storage. This tradeoff will vary based on the size of the population, the degree of connectivity, and the firing rate of the neurons, and can be evaluated with sensitivity studies based on simulation or emulation of caches of various sizes and configurations.

Figure 6:
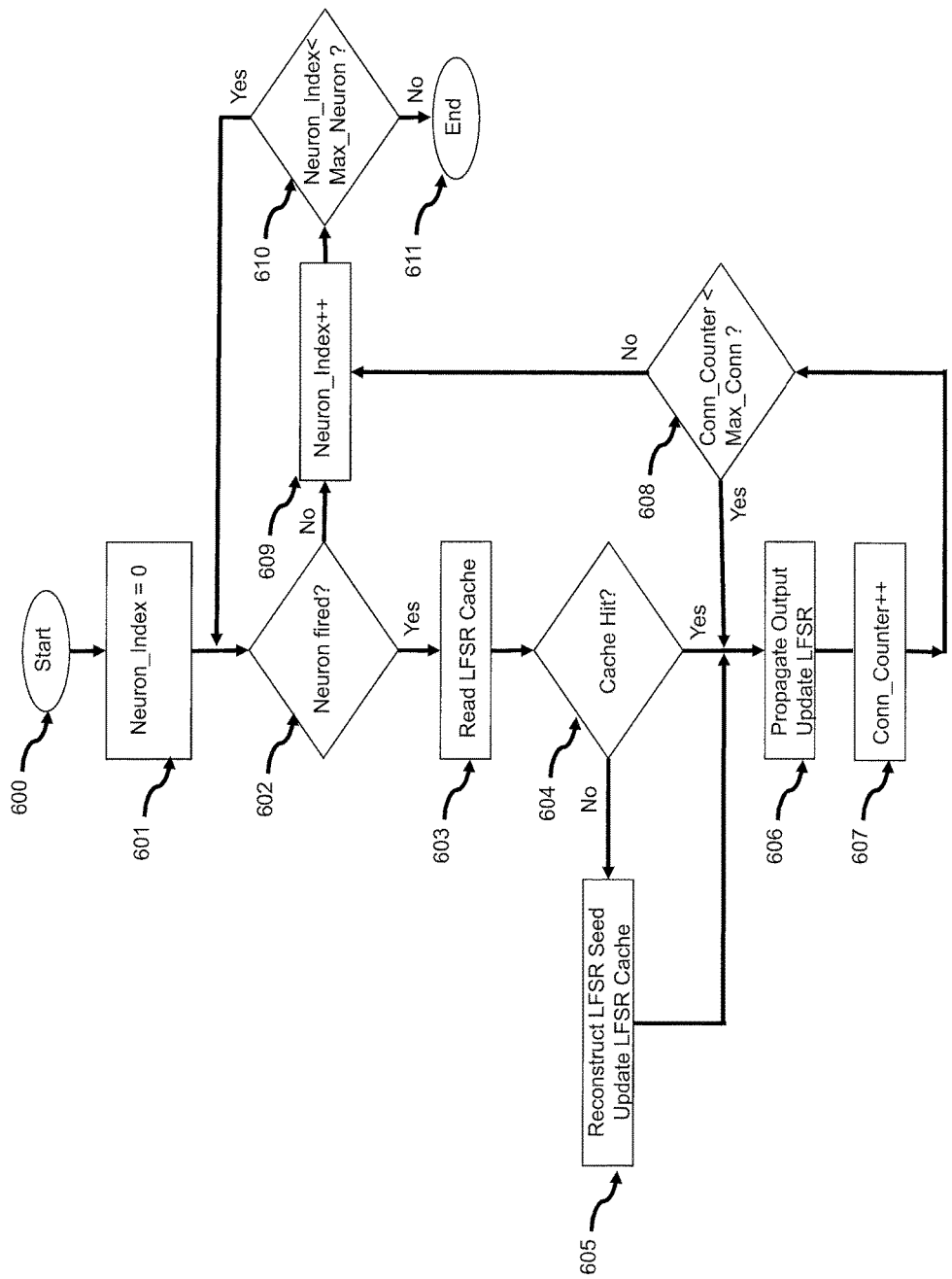
FIG. 6 is a flow chart illustrating the operation of another scalable and efficient neural system using an LFSR cache according the present invention.

Now referring to FIG. 6, the propagation of spikes to downstream neurons can be accomplished by initializing a Neuron_Index to 0 (601), then checking to see if that neuron fired (602), and continuing directly to the next neuron number (609) if it did not, and continuing until all neurons in the population have been checked (610) and terminating once that is true (611). For neurons that did fire, the LFSR cache is accessed in the manner described above (603), and on a cache-hit condition (604), the spike is propagated and the LFSR updated (606) for each of the neuron's connections, until all connections have been processed (608). If the cache does not hit, the LFSR seed is reconstructed as described earlier, the LFSR cache is updated (605), and propagation of the spike proceeds as in the case of a hit (606, 607, 608).

Tracking Neurons which Will Fire

In an Efficient and Scalable Neural system according to the present invention, neurons that will fire in the next cycle are tracked. In embodiments discussed above, each neuron in the network must be evaluated at each time step to determine if its membrane potential is above its firing threshold. When the threshold is exceeded, an output spike is propagated to all of the neuron's targets. For sparsely connected networks with low firing rates, however, this method can be further improved. If a neuron has received no excitatory input for many cycles, it certainly will not be firing.

One improvement is to simply evaluate whether the neuron will fire (or not) each time a spike is propagated to it. That is, each time a "source" neuron propagates a spike to a "target" neuron, the membrane potential of a "target" neuron is compared to its firing threshold. When the firing threshold of a "target" neuron is exceeded, that neuron's Neuron_Index is added to a list of future-firing neurons. In the next time step, only the neurons in the list will need to be evaluated.

Many neural algorithms, including LSMs and large-scale models of biological neural networks include both excitatory and inhibitory connections. When a neuron's input connection is excitatory, an incoming spike will increase the membrane potential toward a firing threshold, while an incoming spike on an inhibitory connection will drive the membrane potential away from the firing threshold. For networks with both types of connections, it is also required that a Neuron_Index can be removed from the future-firing neurons list. For example, during time step 1, Neuron_Index 10 propagates a spike via an excitatory connection to Neuron_Index 99. Neuron_Index 99 exceeds its firing threshold, so it is added to the future-firing neuron list (to, in turn, propagate spikes in time step 2). However, in the same time step (1), Neuron_Index 20 propagates a spike via an inhibitory connection to Neuron_Index 99, bringing it again below its firing threshold. In this case, Neuron_Index 99 must be removed from the list of future-firing neurons.

Another consideration for improvement is the neuron's membrane leak, as discussed above. Since this improved approach avoids updating each neuron at each time step, a method must be used to ensure functionally equivalent behavior. For non-firing neurons, it must be ensured that the next time it receives an input (whether excitatory or inhibitory), the neuron's membrane potential is updated to reflect the number of time steps it leaked.

In one implementation, this can be tracked with some simple counters using a small number of bits per neuron. For example, a global counter of at least n-bits would be used to track the current time step. An n-bit memory, UPDATE[i], could be allocated for each neuron i. On the first time step of the network, UPDATE[i] is initialized to all zeros for each neuron 1. When a neuron is updated (i.e. it has received an incoming spike), its UPDATE[i] is subtracted from the n Least Significant Bits (LSBs) of the global time step, yielding the number of time steps since the most recent leak or update. The membrane leak is then applied appropriately (i.e. in proportion to the number of time steps since the most recent leak or update). After the leak has been applied, the neuron's current input (the one that initiated the comparison of UPDATE[i]) can be applied to neuron is membrane potential. UPDATE[i] is then set to the current n-LSBs of the global timestamp, indicating the last time that neuron i was updated. On every $2^n$th cycle of the global timestamp (i.e., when timestamp mod $2^n$==0), a global update of all neurons is performed, instead of using the list (i.e. the same procedure as if the future-firing neuron list was not used). For each neuron i in the network, UPDATE[i] is subtracted from $2^n$, and the membrane leak is applied appropriately (as if the neuron had received an input). In this way, even the neurons that are not receiving input spikes are updated appropriately every $2^n$th cycle. UPDATE[i] for each neuron i is again set to 0, and the process repeats.

With this improvement, on the other $2^n$-1 cycles, only the neurons that were added to the future-firing neurons list are updated. The full list of neurons must be inspected and updated only once out of $2^n$ cycles, and the incremental inspection and update (just neurons on the future-firing list) is performed otherwise. For large neural networks with sparse firing, this has the potential to significantly reduce computational requirements.

In the worst case, when all neurons are firing at the same time, the future-firing list must be provisioned for all neurons. However, in the general case, with typical LSM and models of biological neural networks, firing is typically sparse. The future-firing neuron list can be implemented in either hardware or software. Furthermore, this improvement of the system is not limited to the particular update algorithm described above.

Using State Skip LFSRs

Beyond storing or caching the LFSR seeds, an Efficient and Scalable Neural System according to the present invention can leverage computational methods for reducing the number of state transitions that the LFSR must go through. For example, State Skip LFSRs were originally introduced as a method to reduce the length of embedded test sequences in modern Systems on Chip (SoCs). See, e.g., "State skip LFSRs: bridging the gap between test data compression and test set embedding for IP cores" by Vasileios Tenentes, Xrysovalantis Kavousianos and Emmanouil Kalligeros, *Proceedings of the Conference on Design, Automation and Test in Europe*, ACM, 2008. With State Skip LFSRs, a small linear circuit is designed for the particular polynomial implemented by the LFSR. When utilized, this circuit can advance the state of the LFSR by a constant number of states in just one step or clock tick. Such a circuit, or software corresponding to such a circuit, can be used in an Efficient and Scalable Neural System according to the present invention.

Typically, a State Skip LFSR uses a 2-input multiplexer to select between two different feedback networks, yielding either the normal LFSR sequence update (advancing the LFSR by one state), or a State Skip update corresponding to m normal updates (advancing the LFSR by m states). It is also possible to design a State Skip LFSR with m+1 different feedback networks and an m+1-input multiplexer, so that either the normal LFSR sequence update or one of m different skip amounts may be selected at each step or clock tick.

For neural algorithms in which firing (i.e. generated outputs) are sparse, this State Skip method can be used to quickly advance the LFSR to the correct state. Consider for example a network of 1000 neurons, with 10 connections each, where only neuron number 100 is firing. In the typical approach, the LFSR would need to be sequenced 1000 times (100×10). If a State Skip LFSR circuit is created to skip 1000 states at a time, only a single update to the LFSR must be made via the State Skip circuit.

In an Efficient and Scalable Neural System according to the present invention, various permutations of the State Skip LFSR may be utilized, at different granularities. For example, one State Skip amount may be 10 states at a time, while another may be 100, and another may be 1000. These State Skip amounts may be selected via a multiplexer, depending on the number of neurons firing at any particular time step. While this method drastically reduces the number of sequences the LFSR must go through, it incurs the additional overhead of the State Skip circuits (whether implemented in hardware or software) and the multiplexing logic.

In another Efficient and Scalable Neural System according to the present invention, a Programmable State Skip (PSS) circuit or corresponding software is employed. The PSS advances the LFSR by any desired number of states up to $2^p-1$ in no more than p clock cycles of the LFSR or corresponding software steps. The PSS LFSR is designed to allow any of p different state-advance amounts—1, 2, 4, . . . , $2^{p-1}$—to be selected and performed in one clock cycle or software step. If S is the number of states by which the PSS LFSR is to be advanced, then it is advanced up to p times, once by $2^{i-1}$ for each nonzero bit i in the binary representation of S.

The PSS described above may be sped up to use fewer clock cycles or software steps by providing a larger number of state-advance amounts and considering groups of two or more bits of S at each cycle. Considering two bits at a time is particularly efficient, because it requires only a 50% increase in the number of available state-advance amounts for a 2× speed-up. That is, a 2-bit group has just three corresponding non-zero state-advance amounts, requiring just three corresponding feedback networks and multiplexer inputs, compared to two 1-bit "groups," which require one feedback network and multiplexer input each. A 3-bit group requires seven feedback networks, compared to three feedback networks for three 1-bit groups, and so on.

It should be noted that an efficient and scalable neural system according to the present invention is not limited to the State Skip LFSR implementations, but could take advantage of other methods for selectively reducing the number of times the LFSR must be updated.

LFSR Size and Use of Mersenne Prime LFSR Periods

The LFSR used to construct the pseudo-random neural connectivity should be no smaller than ceil(log$_2$(target population size)) to ensure that all-to-all connectivity is possible. For example, a target population of 300 neurons would require an LFSR of at least 9 bits, since a smaller 8-bit LFSR only generates 255 unique target values, preventing full connectivity in the set of targets generated by the LFSR. However, there are valid reasons to use larger LFSRs than the minimum required. LFSRs are periodic by design: that is, the same sequence of pseudo-random values repeats itself with a period determined by the size of the LFSR. For LFSRs that use ideal taps, this period is $(2^n-1)$ for an n-bit LFSR. If the neural connectivity is constructed with an LFSR that is minimal in length with respect to the population, the LFSR's period may repeat within a single time step, particularly for populations with a large degree of fan-out. This could lead to repeating patterns in the connectivity that cause problematic behaviors. For example, the neuron population could have two disjoint sets of neurons that connect to an identical set of target neurons, since the LFSR's period synchronizes with the starting points of those neurons in the evaluation sequence. Such a connectivity graph would violate the required random (or pseudo-random) nature of the connections, since it would expose the underlying periodic nature of the LFSR.

Figure 4:
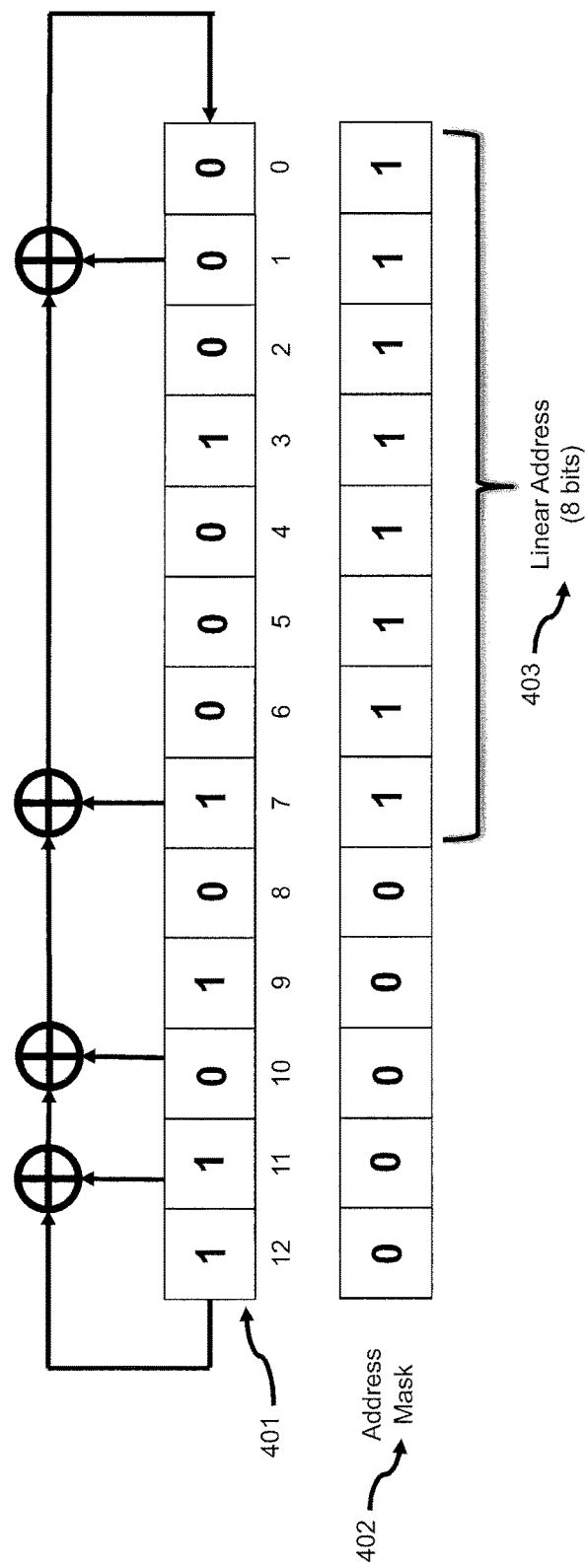
FIG. 4 depicts how a 13-bit LFSR is used to construct target neuron addresses for a neural network with a population of 256 neurons according to the present invention.

To avoid these kinds of problems, it is prudent to utilize LFSRs that are significantly oversized with respect to the neuron population, and to use only a masked subset of the bits in the LFSR to construct target addresses. For example, a modest neuron population of 256 neurons would need a minimum LFSR size of 9 bits, with a period of 511. However, a 13-bit LFSR could be utilized instead, with a period of 8191, with target addresses selected based on the masked low-order 8 bits of the 13-bit LFSR. As shown in FIG. 4, a 13-bit LFSR can be designed to generate 8191 random numbers (401), with an address mask (402) that selects the lower 8 bits to specify the connectivity used between the neurons (403). The longer period of 8191 virtually guarantees that there will be no problematic periodic synchronization of LFSR seeds between sets of neurons in the population.

Furthermore, it is beneficial to choose LFSR lengths with periods that correspond to Mersenne primes. Mersenne primes are defined as prime numbers that are one less than a power of two: $(2^n-1)$. Since ideal LFSRs always have a period length that is one less than two raised to the length of the LFSR (e.g. a 13-bit LFSR has a period of $2^{13}-1=8191$), a subset of possible LFSR lengths will have a period equal to a known Mersenne prime. These LFSR lengths are particularly desirable because a period length that is also a prime makes it extremely unlikely that problematic periodic synchronization will occur in the embodiment system disclosed in Section 2, since the prime number (i.e. the period length) cannot be factored. Following this design principle in an embodiment system will ensure that only those populations whose total connectivity is an exact multiple of the chosen Mersenne prime will suffer from periodic synchronization of LFSR seeds. As long as the chosen Mersenne prime (and corresponding chosen LFSR size) is large relative to the size of the population times the output connectivity, this cannot happen.

Generating Non-Uniform Distributions

The sequence of target addresses generated by the LFSR will have a uniform distribution between 1 and the LFSR's period length. While a uniform distribution is desirable in many modeled neural target populations, it is also often necessary to provide distributions that are not uniform. For example, neurobiological studies show that neural connections often have highly skewed distributions, with far more local connections than remote connections. Generating such non-uniform distributions typically requires use of transcendental functions and floating-point arithmetic, which can be prohibitively expensive to do at runtime. Instead, skewed distributions can be generated to approximate a normal or Gaussian distribution by simply adding up multiple smaller values and using their sum as the target address. According to the central limit theorem, the sum of multiple independent and identically distributed random values will follow a normal distribution. The shape (or variance) of the distribution can be governed by the number of additions; sharper distributions result from a larger number of additions, while broader distributions can be achieved with just a few additions.

To generate a normal distribution, the LFSR approach described above can be used to generate two or more pseudorandom numbers for each connection, and then add the numbers together to generate the target address. The numbers must be scaled so that their sum reflects the target population size. For example, for a target population size of 512 neurons, two 8-bit numbers, or four 7-bit numbers, or 8 6-bit numbers, and so on, should be added.

Finally, the expected value of the Gaussian distribution can be centered anywhere in the population by adding a fixed offset to it. For example, to model a Gaussian distribution centered on the neuron itself (i.e. most connections are local), first a target address is generated using the adding scheme described above. This will provide a distribution with an expected value that is half the population size (e.g. 256 for a population of 512). Then, a negative offset of 256 (half the population size) is added to the value to center the distribution at zero. Finally, this number is added to the generating neuron's index ID as an offset to compute the final target address.

Figure 7:
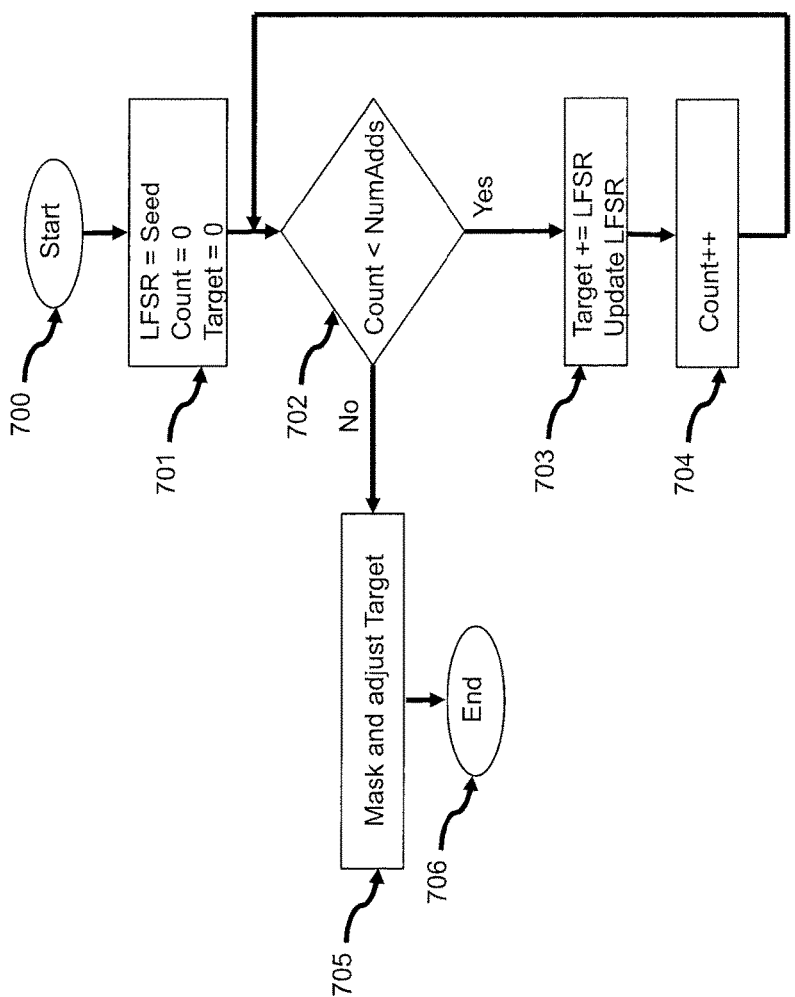
FIG. 7 is a flow chart illustrating non-uniform distribution generation of neuron target addresses according to the present invention.

Referring now to FIG. 7, a normal distribution of targets can be generated with the LFSR approach by first initializing the LFSR to its seed value and initializing the Count and Target to zero (701). As long as the count remains below the number of additions specified to generate the desired variance in the distribution (702), a masked subset of the LFSR bits is added to the Target, the LFSR is updated (703), and the Count is incremented (703). Once all additions have been completed, the Target is masked and adjusted (705) as described above to generate the final target address.

The preceding discussion applies to neuron populations that are linearly numbered. The same principle can be applied to two-dimensional and three-dimensional neuron topologies. In these topologies, the distance from one neuron to another is typically approximated with the "Manhattan Distance," i.e. the sum of the distance in each dimension (distance in x+distance in y in two dimensions, x+y+z in three dimensions, and so on). In these topologies, for randomly selected target coordinates specified in two or three dimensions, the Manhattan distance naturally follows a normal distribution, since it is defined as the sum of two or more independent and identically distributed variables. Therefore, a normal distribution of Manhattan distance is straightforward to achieve in such networks. The distribution can be further sharpened by applying the same technique (adding multiple random numbers) to each dimension individually.

2.4 Extending the Invention Beyond Neuron Connectivity

In highly connected neural algorithms, the key advantage of this invention is that connectivity information no longer needs to be stored, but can be re-calculated on demand in an energy and compute efficient way. However, the same principle can be applied to many of the other components and properties of biological neurons that are often modeled in artificial hardware and software neurons.

Connectivity/Receptor Types

In biological neurons, the synapses, or connections between neurons, exhibit different properties and types. In the simplest type of implementation, connections may be either excitatory or inhibitory. Excitatory connections result in an increase in the downstream neuron's membrane potential, while inhibitory connections result in a decrease in the downstream neuron's membrane potential. In hardware and software neuron implementations with a higher degree of biological fidelity, these connections may model very specific types of synapses, such as those dominated by AMPA, GABA, NMDA, or other types of receptors.

In the various embodiments of the present invention discussed above, the synapse and connection types must be stored in memory, so during neuronal updates, the current type of connection is used. However, these parameters can also be re-calculated on the fly, further reducing the amount of storage needed to describe the neural network. In the simplest case, a counter can be used to recalculate the outgoing connection types. For example, when a neuron fires, its first 100 output connections may be excitatory, while the next 200 output connections can be inhibitory. Alternatively, as was described with the neuron connectivity above, an LFSR can be used to randomly select which outgoing connections are excitatory or inhibitory. If both the connection type and the connectivity between neurons are random, either a single LFSR can be used for both, or two different LFSRs may be used. If a single LFSR is used, it now must have a larger period (e.g., number of neurons×number of connections×number of receptor types). If two separate LFSRs are used, one may consider implementing a different polynomial for the connection LFSR and receptor type LFSR, to ensure they are not correlated. Again, as described above, in the simplest implementation, only the seed of each LFSR must be stored to maintain a consistent architecture of the neural algorithm (i.e. for every time step, the same output connections remain excitatory or inhibitory).

Synaptic Weights

Similarly, in biological neurons, the strength of the connection between neurons (synaptic weights) exhibits spans a wide degree of values. In traditional implementations of artificial neural algorithm, the synaptic weights must be stored in memory. If a neuron has 1000 output connections, and each connection requires a precision of 8-bits, a total of 8000 bits of storage is required for the synaptic weights of each neuron.

Using again the invention described in this patent, the synaptic weights can alternatively be re-calculated. If 8-bit precision is needed for synaptic weights, a single 8-bit LFSR could potentially be used to replace the 8000 bits of storage.

This type of synaptic weight model is only appropriate for neural networks that do not require the modification of synaptic weights over time. For many implementations of LSM neural networks and models of biological neural networks, this is often the case.

Axonal and Dendritic Delays

In biological neural networks, the connections between neurons exhibit different delays, often relating to the physical length of the output of one neuron (the axon) and the input of the other neuron (the dendrite). Modeling axonal and dendritic delays often has valuable properties in artificial neurons when they are used to process time-varying signals. Therefore, traditional neuron modeling techniques again use memory storage to leverage delay properties, which again, can become quite expensive in large scale networks.

Using again the invention described in this patent, the delays of these connections can be re-calculated on the fly.

Re-Calculating Neuron Properties

Beyond the properties described above, which primarily relate to the connections between neurons, there are many other parameters related to integrate-and-fire neurons that are typically stored in memory in traditional models. These include things like the firing threshold of the neuron, the refractory period of a neuron (i.e. the minimum amount of time between two firings of a neuron), the decay rate of a neuron's membrane potential in the absence of inputs, and many other attributes relating to the neuron's type and morphology.

For modeling large networks of neurons, the same techniques can be used to simply re-calculate each of these modeled properties. In many cases, such as large scale models of biological neural networks, or randomly connected networks like LSMs, using an LFSR to decide each of these properties is computationally efficient, and many orders of magnitude more efficient in memory requirement. Again, by simply storing the initial seeds of the LFSR, whether on a network basis, a population of neuron basis, or a per-neuron basis, the architecture of the neural algorithm can be preserved while essentially eliminating nearly all the memory and storage requirement to describe the network.

By extension, this same technique can be used to recalculate any other neuron or connection properties not discussed in this embodiment.

Connecting Neuron Populations

As described, the proposed scheme is useful for connecting neurons in a single population. However, the same approach can be used to connect neurons from one population to neurons in another population. Assuming a linear numbering scheme for all neurons in the system, this can be achieved very simply, by generating a target address offset corresponding to the size of the target population, and adding that offset to the base address for the target population. For example, if the target population has linear neuron addresses from #212 to #275, the system will generate an offset between 0 and 63, and will add that offset to the base address of #212.

This scheme can easily be extended to hierarchical or other irregularly structured neural network topologies that do not follow a linear numbering scheme. In this case, the target population is still assumed to use a linear numbering scheme to give neurons a unique ID, and the target offset is chosen as before. This offset is then communicated to the target's node in the hierarchy or irregular topology, where it is used as an offset into the population. This approach is workable for any neural network models where the target populations contain a set of target neurons that utilize a linear numbering scheme. If there is no linear numbering scheme, the linear address (number) generated by the scheme will have to be translated to whatever naming or numbering scheme is used in such a network. Care must be taken to ensure the translation does not alter the distribution of the addresses generated by the mechanism (i.e., a uniform distribution should remain uniform after the translation is applied).

Furthermore, the LFSR targeting scheme can be applied hierarchically for biological-scale fan-outs in very large networks. In such an embodiment, a specific neuron can use the scheme to generate a pseudorandom list of target populations from the entire set of available target populations. The spiking event is then communicated to each of those target populations. At the destination population, a receiver will again employ the proposed scheme to locally generate the specific targets within the local population that are to receive the spike. This scheme minimizes the amount of traffic in the interconnect between the two populations (by communicating a single spike between each pair of populations) while distributing the work of computing the final target neurons across each of the target populations. This approach can be extended to multiple hierarchical levels or less regularly connected (not necessarily hierarchical) populations of populations of neurons and is directly analogous to techniques employed for efficient multicasting in computer networks.

Finally, many neurons have disjoint sets or classes of connections, some of which project locally, some which project to one target population, and some to a second target population, and so on. Examples of such neurons include those that make up a column or a mini-column in a column-based neural model, or those that are part of an attractor in an attractor network model. The system can be extended to handle such complex neural connectivity by applying the LFSR-based connectivity scheme separately to each class of connections. That is, a set of target addresses within the local population is generated first, followed by a set of target addresses to the first remote population, then the second target population, and so on, where the fan-out to each population, as well as the size and base offset of each population, can be different.

Parallel and Serial Embodiments of the Invention

The most natural embodiment of the system described above is a serial one, since a single LFSR must be shifted to generate a deterministic sequence of targets for all of the neurons in the population. However, a parallel embodiment is also possible, and often desirable. In a parallel embodiment, the set of neurons in the population can be distributed across multiple processing elements, each with its own LFSR. The parallel processing elements can now generate target addresses independently. In the extreme parallel embodiment, each neuron has its own processing element and LFSR. The system can be flexibly adapted to any degree of parallelism between this extreme and the serial one, depending on the parallelism available on the execution substrate being used to deploy the system.

The parallel embodiment need not exactly match the semantics of the serial embodiment. That is, the parallel processing elements may generate targets for their neurons that are not an exact match to the targets generated by the serial embodiment. As long as the targets match the distribution and target population requirements for the task, an inexact parallel embodiment is useful.

On the other hand, to implement a parallel embodiment that exactly matches the semantics of the serial and single-LFSR embodiment, the parallel LFSRs must be initialized with appropriate seed values when the system begins execution. In other words, the seed value for each parallel LFSR must correspond to the seed value for the first neuron in the set of neurons assigned to it, so that the LFSR generates the same targets as the serial embodiment would for each of those neurons. Initialization can be achieved by sequencing a single LFSR in the first processing element through all the neurons in the population and communicating the appropriate seed values to each of the parallel LFSR elements. Alternatively, each parallel processing element can determine its LFSR seed by sequencing its own LFSR from a common initial seed to the value corresponding to the first neuron in the set of neurons assigned to it.

Parallel embodiments may also take advantage of the caching scheme described above. Using such hybrid schemes, it is possible to create neural systems that target any of the constraints or advantages of the underlying computational substrate in terms of available parallelism and memory.

3. Exemplary Application

One application for an Efficient and Scalable Neural Connectivity system according to the present invention is a Liquid State Machine (LSM) neural network. LSMs have been shown to be quite useful for applications such as classifying time-varying audio signals. Referring to FIG. 2, the typical network architecture of an LSM is depicted. In typical operation, a time varying signal, such as an audio signal 200, is the input to the network. With an LSM, typically some type of encoder (201) is used to convert the raw signal into spikes (202), which serve as the inputs to the LSM (203). The LSM itself is typically composed of spiking integrate-and-fire neurons (204). In the majority of LSM implementations, the connectivity between the neurons in an LSM is random. Finally, the activity states of the LSM are typically classified by one or more different output units (205), which may be linear threshold units, perceptrons, or another type of classifier.

As was discussed above, in a typical scheme, the random connectivity of the LSM (203) would need to be stored in memory. In FIG. 2, there are only 7 neurons and 11 connections. However, in typical LSM implementations deployed for audio signal classification, thousands of neurons may be used, with tens of thousands of connections in the LSM. As networks are scaled even larger, it becomes entirely impractical and impossible in modern hardware and software solutions to effectively store these connections.

Figure 3:
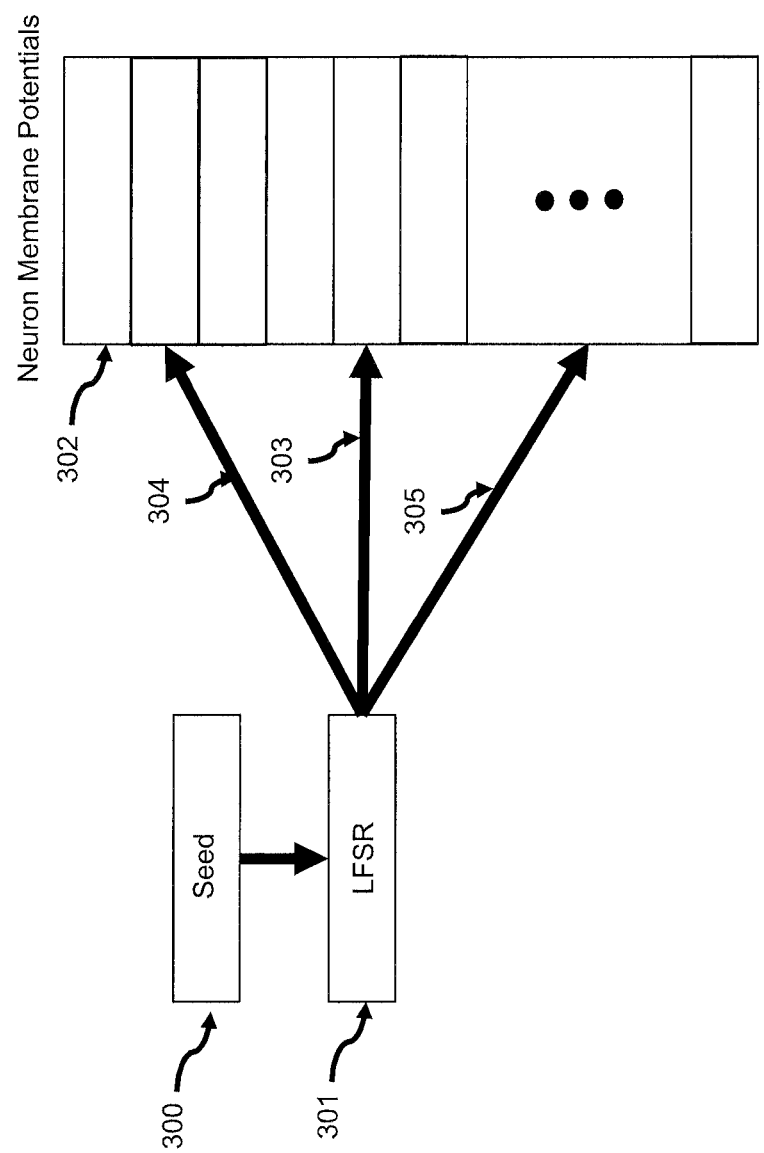
FIG. 3 depicts a simplified LSM architecture using an LFSR to calculate the output connections of neurons according to the present invention.

Referring to FIG. 3, the efficient and scalable neural connectivity system according to the present invention can be applied to the LSM to drastically reduce the memory needed to implement the LSM architecture. When a particular neuron in the LSM fires, the output connections of the neuron are not stored in memory, but calculated using an LFSR (300). As discussed above, for each particular neuron in the LSM, the neuron must use the same seed (301) each time it fires to ensure that its outgoing connections are consistent across all time steps. If all neurons share the exact same LFSR, a single seed can be used for the entire LSM network, provided that the LFSR is updated the same number of times on each simulated time step. Alternatively, multiple seeds can be stored to reduce the number of times the LFSR must be updated, with the most extreme case being that each neuron stores its own seed value. The firing neuron updates the membrane potentials (302) of its target neurons. Again, since the same seed is used by the neuron each time it fires, its communication to its target neurons is deterministic, even though the actual connections themselves appear to be randomly chosen (connections to targets 303, 304, and 305).

The System for Efficient and Scalable Neural Connectivity can be used to implement LSMs in either hardware or software, as both can benefit from reducing the memory required to store neural connectivity. The benefit is quite clear for LSMs, which often exhibit and require random connectivity between neurons, and the benefits increase as the size of the network and scale of connectivity is increased. Similarly, other parameters involved with the LSM architecture, such as connection type, axonal and dendritic delays, and other neuron parameters can be simply re-calculated. Updating the LFSR requires relatively few instructions (XORs and shifts), comparable to the number of instructions typically needed to access the stored parameters and state of a neuron in traditional techniques. However, these traditional techniques also include the latency and overhead of memory access, which has the potential to be quite significant in large scale LSMs, while the System for Efficient and Scalable Neural Connectivity requires minimal memory access.

The disclosed solution above can be extended to target neurons within a population, or across different larger populations of neurons. This system can be implemented either as a hardware system or a software system, as both implementations can take advantage of the memory-saving capability of this invention. Furthermore, this same principle, to favor simple, cheap, and energy efficient re-calculations over memory storage, can be applied to many other properties and parameters of artificial neural models and systems, such as connectivity type, axonal and dendritic delay, neuron membrane potential, neuron membrane leakage, neuron threshold, and nearly any other neuron parameter that is typically stored. Finally, purely serial, purely parallel, or hybrid implementations of this invention are possible, allowing the invention to be optimized to any computational substrate.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A scalable system for recalculating, in an event-driven manner, property parameters including connectivity parameters of a neural network, the system comprising:
   an input component that receives a time varying input signal;
   a state machine comprising a pseudo-random number generator with a seed value, wherein the state machine is capable of recalculating property parameters of the neural network using the seed value, wherein the property parameters include connectivity among neurons of the neural network, and wherein the connectivity is deterministically generated by the pseudo-random number generator without reference to preexisting connectivity stored in memory, wherein the state machine is capable of generating a unique identifying number for each neuron in the neural network, and, wherein the state machine comprises a neuron identification counter with a first predefined initial value and a neuron connectivity counter with a second predefined initial value, wherein both the first predefined initial value and the second predefined initial value are utilized to update the state machine, and, wherein the pseudo-random number generator of the state machine comprises a Linear Feedback Shift Register (LSFR);

a storage component containing a plurality of predefined seed values from which a particular seed value is chosen for the pseudo-random number generator, wherein the number of seed values is less than the number of property parameters to be recalculated; and an output component that generates output signals reflective of the calculated property parameters of the neural network and the input signal.

2. The system of claim 1, wherein the LFSR is configured to generate certain property parameters including connectivity.

3. The system of claim 1, wherein upon initialization, the state machine is configured to perform the following:

comparing the value of the neuron connectivity counter (Conn_Counter) to a predefined final value;

if Conn_Counter value is not equal to the predefined final value, causing the state machine to update, changing the Conn_Counter to a next value, and updating property parameters of the neuron identified by the neuron identification counter (Neuron_Index) in response to the input signal;

if Conn Counter value is equal to the predefined final value, changing Neuron_Index to a next value;

comparing Neuron_Index to a predefined total number of neurons in the neural network; and if Neuron_Index value is not equal to the predefined total number of neurons in the neural network, resetting the Conn_Counter to the second predefined initial value and repeating the above steps for next neuron as identified by the Neuron_Index.

4. The system of claim 1, wherein the input component converts the received time varying input signal into a sequence of spikes.

5. The system of claim 1, wherein the state machine recalculates connectivity of a neuron currently being evaluated using a seed value corresponding to the neuron currently being evaluated only when the neuron currently being evaluated fires in response to the input signal.

6. The system of claim 5, wherein the state machine is configured to further perform the following:

maintaining a list of future firing neurons, wherein the recalculating at each time step is conducted only on neurons identified on the list;

for each target neuron of a neuron that fires at a current time step, comparing current membrane potential of that target neuron to a corresponding predefined firing threshold of that target neuron;

adding identity of a target neuron to the list of future firing neurons if the current membrane potential of that target neuron exceeds the corresponding predefined firing threshold; and removing an identity of a target neuron from the list of future firing neurons if current membrane potential of that target neuron is below the corresponding predefined firing threshold.

7. The system of claim 1, wherein the storage component is configured to store seed values corresponding to the neurons in the neural network for the state machine and the state machine is configured to perform the following:

determining whether a neuron identified by the neuron identification counter (Neuron_Index) fires in response to the input signal;

if the neuron identified by the Neuron_Index fires, retrieving from the storage component a seed corresponding to the neuron identified by the Neuron_Index, initializing the neuron connectivity counter (Conn_Counter) to the second predefined initial value;

comparing Conn_Counter value to a predefined final value;

if Conn_Counter value is not equal to the predefined final value, causing the state machine to update to a next state, changing Conn_Counter to a next value, and repeating this step;

if Conn_Counter value is equal to the predefined final value, changing Neuron_Index to a next value;

comparing Neuron_Index to a predefined maximum number of neurons in the neural network; and if Neuron_Index value is not equal to the predefined maximum number of neurons in the neural network, repeating the above steps for a next neuron as identified by Neuron_Index.

8. The system of claim 1, wherein the storage component includes a cache for storing seed values used by the state machine for recalculating certain property parameters.

9. The system of claim 8, wherein the state machine is configured to further perform the following:

calculating a seed value necessary for recalculating certain connectivity parameters upon determining that the seed value necessary for recalculating certain connectivity parameters is not stored in the cache; and updating the cache to include the calculated seed value according to a predetermined cache rule.

10. The system of claim 1, wherein the state machine comprises:

a state skip unit with a number (N) of feedback networks, wherein each feedback network generates, in a number (M) of clock cycles, a state of the state machine after sequentially advancing a programmable number (P) of states from the state machine's current state, and M<P; and a multiplexing circuit for updating the state machine by selecting one of the N feedback networks.

11. The system of claim 1, wherein the identifying number of a target neuron in the network is the sum of a predefined offset value and multiple random numbers generated by the state machine so as to center the normalized distribution of the target neurons.

12. The system of claim 1, wherein the state machine is also used to generate a connection type for each neuron of the network.

13. The system of claim 1, wherein the property parameters further include neural delays of each neuron in the network.

14. The system of claim 1, further comprising:

a plurality of processing elements, wherein each processing element has a state machine and is capable of calculating property parameters of a subset of neurons of the neural network.

15. The system of claim 1, wherein the state machine is configured to cache seed values of the state machine corresponding to N neurons last fired.

16. A computer-implemented method for recalculating network property parameters of a neural network including connectivity parameters in an event-driven manner, the method comprising:
initializing property parameters of the neural network;
receiving, at an evaluating neuron of the neural network, a neural input corresponding to a time varying input signal to the neural network;
recalculating, by a state machine comprising a pseudo-random number generator with a seed value, at least some of the property parameters of the evaluating neuron, wherein the connectivity parameters are deterministically generated after initialization by the pseudo-random number generator using the seed value without reference to preexisting connectivity stored in memory, wherein the state machine is capable of generating a unique identifying number for each neuron in the neural network, and, wherein the state machine comprises a neuron identification counter with a first predefined initial value and a neuron connectivity counter with a second predefined initial value, wherein both the first predefined initial value and the second predefined initial value are utilized to update the state machine, and wherein the pseudo-random number generator comprises a Linear Feedback Shift Register (LFSR);
determining whether the evaluating neuron is to generate a neural output to its target neurons in the neural network; and
if the evaluating neuron is determined to generate a neural output to its target neurons in the neural network, propagating the output of the evaluating neuron to its target neurons,
wherein a particular seed value is chosen from a plurality of predefined seed values for the pseudo-random number generator, the plurality of predefined seed values being contained in a storage component, and wherein the number of seed values is less than the number of property parameters to be recalculated.

17. The method of claim 16, wherein the property parameters of the neural network include on or more parameters of the group consisting of the maximum number of neurons in the neural network, seed values for pseudo-random number generation, neural axonal and dendritic delay values, positive connectivity strength values, negative connectivity strength values, neuron refractory period, decay rate of neural membrane potential, neuron membrane potential, and neuron membrane leakage parameter.

18. The method of claim 16, wherein the determining comprises:
calculating current membrane potential of the evaluating neuron based on the neural input and the connectivity parameters of the evaluating neuron;
comparing the calculated membrane potential to a firing threshold value of the evaluating neuron; and
reporting that the evaluating neuron is to generate an output if the calculated membrane potential exceeds the firing threshold value.

19. The method of claim 16, wherein the recalculating comprises:
retrieving a stored seed value corresponding to the evaluating neuron; and
calculating connectivity parameters of the evaluating neuron using the retrieved seed value.

20. The method of claim 16, wherein the recalculating comprises calculating connectivity of a neuron currently being evaluated only when the neuron currently being evaluated fires in response to the input signal.

21. The method of claim 16, further comprising retrieving a seed value of the state machine for recalculating the connectivity parameters of the evaluating neuron from a cache coupled to the state machine.

22. The method of claim 21, wherein the retrieving further comprises:
calculating the seed value of the state machine for recalculating the connectivity parameters of the evaluating neuron upon determining that the cache does not store the seed value; and
updating the cache to include the calculated seed value according to a predetermined cache rule.

23. The method of claim 16, further comprising:
maintaining a list of future firing neurons, wherein the updating at each time step is conducted only on neurons identified on the list;
for each target neuron of a neuron that fires at a current time step, comparing the current membrane potential of that target neuron to a corresponding predefined firing threshold of that target neuron;
adding an identity of a target neuron to the list of future firing neurons if the current membrane potential of that target neuron exceeds the corresponding predefined firing threshold; and
removing an identity of a target neuron from the list of future firing neurons if the current membrane potential of that target neuron is below the corresponding predefined firing threshold.

24. The method of claim 16, wherein the recalculating further comprises: sequentially advancing a programmable number (P) of states beyond the current state of the state machine in a number (M) of clock cycles, wherein M<P.

25. The method of claim 16, further comprising:
taking sum of the state machine results to form a uniform distribution; and
adding an offset to center the normalized distribution in calculating addresses of the target neurons.

26. The method of claim 16, wherein the recalculating further comprises using the state machine to generate a distinct connection type for each neuron of the network.

27. The method of claim 16, wherein the property parameters include neural delays of the neurons.

28. The method of claim 16, wherein the recalculating is carried out by a plurality of processing elements, wherein each processing element has a state machine and is capable of calculating property parameters of a subset of neurons of the neural network.

* * * * *